United States Patent
Kajigano

(10) Patent No.: US 7,471,616 B2
(45) Date of Patent: Dec. 30, 2008

(54) OPTICAL DISC REPRODUCING APPARATUS AND REPRODUCING METHOD

(75) Inventor: Toshiyuki Kajigano, Fukushima (JP)

(73) Assignee: D&M Holdings Inc., Kawasaki-shi, Kanagawa (JP)

(*) Notice: Subject to any disclaimer, the term of this patent is extended or adjusted under 35 U.S.C. 154(b) by 1021 days.

(21) Appl. No.: 10/951,622

(22) Filed: Sep. 29, 2004

(65) Prior Publication Data
US 2005/0226113 A1    Oct. 13, 2005

(30) Foreign Application Priority Data

Mar. 30, 2004   (JP)   ............... 2004-097985
Mar. 31, 2004   (JP)   ............... 2004-104168
Aug. 12, 2004   (JP)   ............... 2004-235475

(51) Int. Cl.
G11B 7/24   (2006.01)
(52) U.S. Cl. ............... 369/275.3; 369/47.22
(58) Field of Classification Search ... 369/275.1–275.5, 369/47.24, 47.22, 47.15, 47.33, 47.19, 47.5, 369/124.04, 47.1; 386/95, 125
See application file for complete search history.

(56) References Cited

U.S. PATENT DOCUMENTS 6,222,805 B1 *  4/2001  Mori et al. ............... 369/47.24

FOREIGN PATENT DOCUMENTS

| EP | 1 143 441 A1 | 10/2001 |
|----|----|----|
| EP | 1 389 776 A1 | 2/2004 |
| JP | 11-296861 | 10/1999 |
| JP | 2002-352507 | 12/2002 |
| JP | 2002-352568 | 12/2002 |

OTHER PUBLICATIONS

"About Super Audio CD", http://www.super-audiocd.com/aboutsacd/format.html.
Monthly Electronics Magazine, May 1999, pp. 92-97.

* cited by examiner

Primary Examiner—Ali Neyzari
(74) Attorney, Agent, or Firm—Dickstein Shapiro LLP

(57) ABSTRACT

An optical disc reproducing apparatus includes a reproducing section which reproduces a first audio data item involving a predetermined number of main track and recorded in a first recording area on the optical disc, and a second audio data item involving an extra track in addition to a main track containing the same contents as those of the predetermined number of main track and recorded in a second recording area on the optical disc, and an identification section which identifies each of the main track and the extra track for the second audio data item, based on the number of tracks for the first audio data and the second audio data.

20 Claims, 6 Drawing Sheets

OPTICAL DISC REPRODUCING APPARATUS AND REPRODUCING METHOD

BACKGROUND OF THE INVENTION

The present invention relates to an optical disc reproducing apparatus which reproduces audio data recorded on an optical disc, and a reproducing method therefore.

As an optical disc on which digital audio data is recorded, CD-DA (Compact Disc-Digital Audio) has been developed. There is recorded on the CD-DA, 16-bit digital audio data with a track pitch of 1.6 µm, obtained by sampling at 44.1 kHz sampling frequency. On the other hand, there has been developed a high-density optical disc, on which 1-bit digital audio data is recorded with a track pitch of 0.74 µm, the data being obtained by sampling at a sampling frequency of 2822.4 kHz and being subjected to delta-sigma modulation (for example, see "About SUPER AUDIO CD", searched on the Internet URL: http://www.super-audiocd.com/aboutsacd/format.html, Mar. 8, 2004).

A hybrid layer disc (hereinafter, referred to as "hybrid disc") is one type of such high-density optical disc. The hybrid disc includes two types of recording layers, i.e., a recording layer (hereinafter, referred to as "HD (High Definition) layer") on which 1-bit digital audio data obtained by sampling at 2822.4 kHz and subjected to delta-sigma modulation is recorded, and a recording layer (hereinafter, referred to as "CD layer") on which 16-bit digital audio data obtained by sampling at 44.1 kHz is recorded. In addition, a single layer disc having only one HD layer, and a dual-layer disc having two levels of HD layers are also categorized as high-density optical disc. Any of those optical discs has a shape identical to that of CD (Compact Disc).

In an optical disc with such a high recording density, the HD layer has a two-channel stereo area where two-channel digital audio data is recorded, and a multi-channel area where digital audio data of multi channels up to six channels is recorded. Data items recorded in the respective areas have basically the same contents.

Furthermore, in the hybrid disc, two-channel audio data including the same contents, which is reproducible by a general CD player, is recorded in the CD layer. An optical disc reproducing apparatus which is capable of reproducing data on such hybrid disc as described above, reads out data recorded in the HD layer and data recorded in the CD layer, by varying a wavelength of the laser beam irradiated from an optical pickup and an aperture ratio of objective lens.

SUMMARY OF THE INVENTION

As for the high-density optical disc as described above, there is a case where an additional track (extra-track) is recorded thereon, in addition to the main track where main contents of the disc are recorded. As an example of the extra track, there is a case where a track, on which a surround test signal such as a sine wave or white noise is included, is recorded after the main track. In addition, there is also a case where a track of audio data is recorded, including a scene of musical production, karaoke performance or the like.

A user may not recognize that such an extra track exists in a particular layer and area, even though it is additionally recorded therein. For example, if the extra track is recorded only in the multi-channel area in the HD layer of hybrid disc, it is hardly recognized that the extra track exists therein, in the case where only the audio data in the CD layer or in the two-channel area is usually reproduced. In such a case, it is required that the user remembers the existence thereof, or refers to a jacket and the like once again. This is extremely inconvenient for the user.

On the other hand, a problem may occur when a disc on which the extra track is recorded is subjected to reproduction. That is, there is a case where a surround test signal is recorded on the extra track, such as a sine wave, a white noise or the like as described above, instead of normal audio data.

The surround test signal is utilized to set an output level of a speaker, so that audio signals outputted from a plurality of speakers create the best surround sound field. Therefore, generally, when data on the main track is reproduced, it is not necessary to target the extra track for reproduction, where such a surround test signal as described above is recorded.

Therefore, if the surround test signal is reproduced subsequent to the main track, a user, who is not aware of the situation, may be astonished and feel unpleasant. Furthermore, due to a reproduction of abnormal sound (sine wave, white noise, and the like), the user may misunderstand that the reproducing apparatus has failed.

With this being the situation, if the user tries not to reproduce data on the extra track which the user does not want to listen to, the user is forced to check a layer or an area where the extra track is recorded, by referring to the attached jacket and the like each time of reproduction, and a target for reproduction should be switched to a layer or an area where the extra track is not recorded.

In view of the situations as described above, the present invention is advantageous in providing an optical disc reproducing apparatus and a reproducing method, being convenient for the user, in which data on an optical disc having both a main track and an extra track can be reproduced.

In addition, the present invention is advantageous in providing an optical disc reproducing apparatus and a reproducing method, in which as for the optical disc having both a main track and an extra track, each of those tracks is identifiable.

The present invention is further advantageous in providing an optical disc reproducing apparatus and a reproducing method, in which as for the optical disc having both a main track and an extra track, a user is allowed to check an existence of the extra track prior to reproduction.

The present invention is still further advantageous in providing an optical disc reproducing apparatus and a reproducing method, in which as for the optical disc having both a main track and an extra track, data on the extra track can be selectively reproduced.

According to the first aspect of the present invention, there is provided an optical disc reproducing apparatus including, a reproducing section which reproduces either a first audio data item involving a first main track, the first audio data item being recorded in a first recording area on the optical disc, or a second audio data item involving an extra track in addition to a second main track containing the same contents as those of the first main track, the second audio data item being recorded in a second recording area on the optical disc, and an identification section which identifies each of the second main track and the extra track for the second audio data item, based on the number of tracks of the first audio data and the second audio data.

The optical disc reproducing apparatus may further include a determination section which determines whether or not the extra track exists in a recording area that is a target to be reproduced by the reproducing section.

For the optical disc reproducing apparatus, when an optical disc is provided with a layer having only a track corresponding to the first main track in addition to the layer provided with the first recording area and the second recording area, the reproducing section may reproduce data on either of the layers, and the determination section may determine whether or not the extra track exists in a layer that is a target to be reproduced by the reproducing section.

The optical disc reproducing apparatus may further include a display section which provides a display informing presence or absence of the extra track, which has been determined by the determination section.

For the optical disc reproducing apparatus, when the determination section determines that the extra track does not exist in the layer that is a target to be reproduced by the reproducing section, the display section may provide a display prompting a user to input an instruction whether or not data on the extra track is to be reproduced.

The optical disc reproducing apparatus may further include a determination section which determines whether or not a track that is a target to be reproduced by the reproducing section corresponds to the extra track identified by the identification section.

The optical disc reproducing apparatus may further include a track designation section which receives from a user a designation of a track that is to be targeted for reproduction.

The optical disc reproducing apparatus may further include a display section which provides a display informing that a track targeted for reproduction is the extra track, when the determination section determines as such.

The optical disc reproducing apparatus may further include a display section which provides a display informing that a track targeted for reproduction is the extra track when the determination section determines as such, and also provides a display prompting a user to input whether or not data on the track is to be reproduced.

The optical disc reproducing apparatus may further include a reproduction instructing section which receives an input from a user to instruct the reproducing section to perform reproduction, wherein, when the determination section determines that a track targeted for reproduction is the extra track, the reproducing section may reproduce data on the track if the reproducing section receives from the user an instruction to perform reproduction via the reproduction instruction section.

According to the second aspect of the present invention, there is provided an optical disc reproducing method, which reproduces a first audio data item involving a predetermined number of a first main track, the first audio data item being recorded in a first recording area on the optical disc, and a second audio data item involving an extra track in addition to a second main track containing the same contents as those of the predetermined number of the first main track, the second audio data item being recorded in a second recording area on the optical disc, including, identifying each of the main track and the extra track for the second audio data item based on the number of tracks of the first audio data and the second audio data.

The optical reproducing method may further include determining whether or not the extra track exists in a recording area that is targeted for reproduction.

For the optical reproducing method, when data on an optical disc is reproduced, which has a layer having only a track corresponding to the first main track without including a track corresponding to the extra track, in addition to the layer provided with the recording areas, it may be determined whether or not the extra track exists in a layer that is targeted for reproduction.

The optical reproducing method may further include providing a display informing presence or absence of the extra track, which has been determined.

The optical reproducing method may further include, when it is determined that the extra track does not exist in a recording area targeted for reproduction, providing a display prompting a user to input an instruction whether or not a reproduction as to the extra track is to be performed.

The optical reproducing method may further include determining whether or not a track targeted for reproduction corresponds to the extra track thus identified.

The optical reproducing method may further include receiving a designation from a user as to a track targeted for reproduction.

The optical reproducing method may further include providing a display informing that the track targeted for reproduction is the extra track, when it is determined as such.

The optical reproducing method may further include providing a displays informing that the track targeted for reproduction is the extra track, when it is determined as such, and also a display prompting a user to input an instruction whether or not data on the track is to be reproduced.

The optical reproducing method may further include receiving a reproducing instruction from a user, wherein, when it is determined that a track targeted for reproduction is the extra track, data on the track is reproduced upon receipt of the reproducing instruction from the user.

BRIEF DESCRIPTION OF THE DRAWINGS

The invention will now be described by way of example with reference to the accompanying drawings, throughout which like parts are referred to by like references, and in which.

DESCRIPTION OF THE PREFERRED EMBODIMENTS

Hereinafter, preferred embodiments of the present invention will be explained with reference to the accompanying drawings. The optical disc reproducing apparatus relating to an embodiment of the present invention reproduces digital audio data recorded on a so-called high-density optical disc, having an area where at least one main track is recorded and an area where at least one extra track is recorded along with the main track.

First Embodiment

Figure 1:
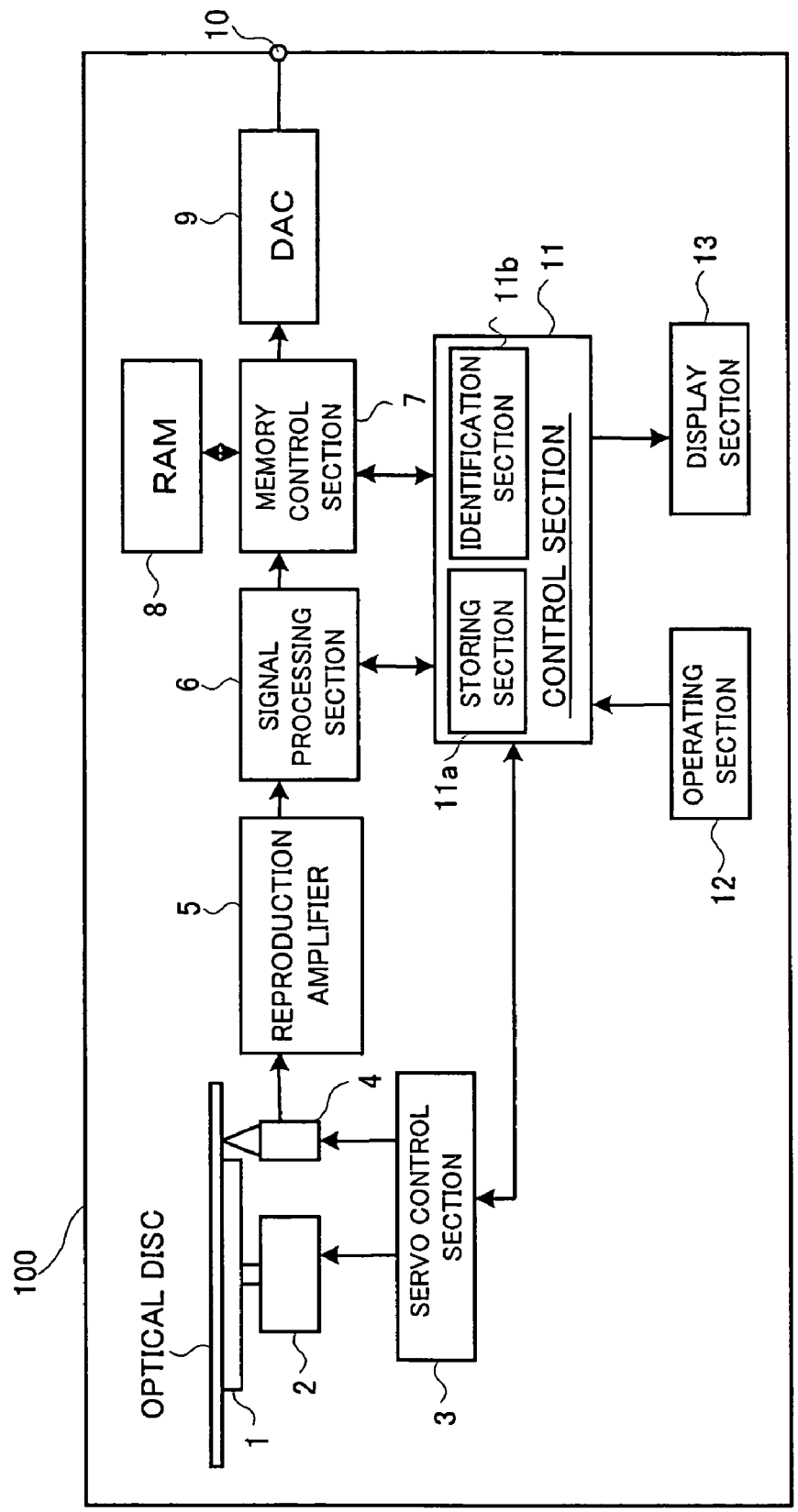
FIG. 1 is a diagram showing an arrangement of the optical disc reproducing apparatus relating to the embodiments of the present invention.

FIG. 1 is a diagram showing an arrangement of the optical disc reproducing apparatus relating to the first embodiment of the present invention. As shown in FIG. 1, the optical disc reproducing apparatus 100 of the first embodiment includes a turntable 1, a spindle motor 2, a servo control section 3, an optical pickup 4, a reproduction amplifier 5, a signal processing section 6, a memory control section 7, RAM (Random Access Memory) 8, DAC (Digital to Analog Converter) 9, an output terminal 10, a control section 11, an operating section 12, and a display section 13.

On the turntable 1 fixed on the spindle motor 2, an optical disc is mounted in settled manner. This optical disc has a recording layer (hereinafter referred to as "HD (High Definition) layer" on which digital audio data of 1-bit is recorded, being obtained by sampling at 2822.4 kHz and subjected to delta-sigma modulation. Hereinafter, a hybrid disc will be explained as a way of example, but not limited to it, which has a recording layer (hereinafter referred to as "CD layer") on which digital audio data of 16-bit obtained by sampling at 44.1 kHz, in addition to the HD layer. An optical disc may be either of a single layer disk including only one level of HD layer and a dual-layer disk having two levels of HD layers. Each of the CD layer and HD layer of the hybrid disc includes a two-channel stereo area and a multi-channel area as described in the following.

When the servo control section 3 receives a user's direction to start reproducing via operation buttons provided on the operating section 12 as described below, the servo control section 3 actuates the spindle motor 2 to rotate at a predetermined linear velocity. In addition, the servo control section 3 controls a focus servo circuit and a tracking servo circuit, not illustrated, so that a laser beam from the optical pickup 4 serving as a reproducing section can properly trace the pit array of the optical disc.

The optical pickup 4 is provided with a laser diode and an objective lens, not illustrated. When the digital audio data recorded on the CD or in the CD layer is read out, a laser beam with wave length of 780 nm is utilized. Alternatively, when the digital audio data recorded in the HD layer is read out, a laser beam with wave length of 650 nm is utilized. In addition, the optical pickup 4 is capable of adjusting an aperture ratio of the objective lens so that focusing is obtained on the recording layer, either of the CD layer and the HD layer.

The digital audio data read out by the optical pickup 4 is subjected to waveform shaping and amplified by the reproduction amplifier 5, and inputted to the signal processing section 6. The signal processing section 6 performs processing such as demodulating the digital audio data read out from the CD or the CD layer, demodulating the digital audio data read out from the HD layer, and extracting an error signal including a focus error signal, a tracking error signal and the like, and a synchronizing signal. The digital audio data processed in the signal processing section 6 is inputted into the memory control section 7.

The memory control section 7 takes control of inputting the digital audio data inputted from the signal processing section 6, to the RAM 8. The RAM 8 stores the digital audio data thus inputted. The digital audio data stored in the RAM 8 is read out under the control of the memory control section 7, and inputted to the DAC 9. The DAC 9 converts the digital audio data to an analog audio signal. The analog audio signal converted by the DAC 9 is outputted from the output terminal 11.

The control section 11 controls the entire optical disc reproducing apparatus 100 in centralized manner. The control section 11 is provided with a memory section 11a which stores management information and the like that is recorded in the area-TOC (Table of Contents) in the two-channel stereo area and multi-channel area in the HD layer of the optical disc. The management information includes the number of tracks for the digital audio data recorded in each of the areas. The control section 11 is further provided with an identification section 11 which identifies a main track and an extra track within the area, based on the number of tracks in each of the areas.

The operating section 12 receives instructions necessary for operating the optical disk reproducing apparatus 100. In the present embodiment, the operating section 12 includes a play button, a stop button, a cursor button, a decision button, a layer switching button, an area switching button, a plurality of designation buttons, and a selection button (not illustrated). For example, these buttons may be replaced by a touch panel and the like, and not limited to buttons, as far as features described below can be implemented.

The play button and the stop button receive an instruction of play/stop playing. The cursor button receives an instruction to select an item. A decision button receives an instruction to make a decision on the item selected by the cursor button.

The layer switching button receives an instruction of switching between reproduction from the HD layer and reproduction from the CD layer, both being provided on the optical disc. The layer switching button is not necessary for a reproducing apparatus which does not support reproduction from the hybrid disc. The area switching button receives an instruction of switching between reproduction from the two-channel stereo area and reproduction from the multi-channel area, both being in the HD layer.

A plurality of designation buttons are provided in such a manner as respectively associated with the track numbers, and receive a designation of the track as a target of reproduction. The selection button receives an instruction whether or not the data on an extra track is to be reproduced.

The display section 13 displays information necessary for the user, when the operating the optical disc reproducing apparatus 100 is operated and data on the optical disc is reproduced. For example, the display section displays information regarding the reproducing time for the track currently being a target of reproduction, the track number, and information indicating whether or not the track is an extra track, which is designated the designation button of the operating section 12.

Here, a structure of the HD layer of the optical disc will be explained. The HD layer includes a lead-in zone, a data zone and a lead-out zone in this order from the inner radius to the periphery of the optical disc. The data zone includes a master TOC (Table of Contents) area and an audio area.

In the master TOC area, there is recorded information regarding a disc, information regarding an area, information regarding a track, and the like. In the present embodiment, for example, information and the like, which indicate the presence or absence of two-channel stereo area and multi-channel area, are managed in the master TOC area.

The audio area includes a two-channel stereo area where two-channel digital audio data is recorded, and a multi-channel area where digital audio data of multi-channel up to six channels is recorded.

Each of the two-channel stereo area and the multi-channel area includes a track area where digital audio data is recorded in the order of the track number. Two area-TOCs are provided respectively back and forth of one track area. In the area-TOCs provided in the two-channel stereo area, information and the like are recorded, which manage a track of the two-channel digital audio data recorded in the track area. Furthermore, in the area-TOCs provided in the multi-channel area, there are recorded information and the like which manage the track of the multi-channel digital audio data recorded in the track area. In the present embodiment, the number of the tracks and the like are recorded, as to the digital audio data recorded in each of the areas.

Each of the two-channel stereo area and the multi-channel area is provided with at least one track (herein referred to as "main track"), those main tracks including digital audio data representing the same contents even if the associated number of output channels are different from each other. Further in the multi-channel area in the present embodiment, at least one track (herein referred to as "extra track") is recorded after a main track, in addition thereto, an extra track containing a surround test signal such as sine wave and white noise. Therefore, in the present embodiment, the number of tracks included in the multi-channel area is larger than the number of tracks included in the two-channel stereo area.

For example, in the two-channel stereo area, ten main tracks (number of tracks: 10) is recorded, and in the multi-channel area, five more extra tracks is recorded (number of tracks: 15). It is to be noted that the number of the tracks is not limited to the example above. The area where extra tracks are recorded may be in the other area. That is, the two-channel stereo area may include 15 tracks (number of extra tracks: 5), and the multi-channel area may include 10 main tracks.

Next, a CD layer will be explained. The CD layer of a hybrid disc has a structure similar to that of a recording layer of a CD. In other words, in the CD layer a lead-in area, a program area and a lead-out area are formed in this order from the inner radius to the periphery of the optical disc. In the program area, there is recorded digital audio data of the same contents as those of the data recorded in the two-channel stereo area or the multi-channel area of the HD layer, even though recording formats are different. In the lead-in area, there is recorded TOC information and the like to manage a track recorded in the program area.

Figure 2:
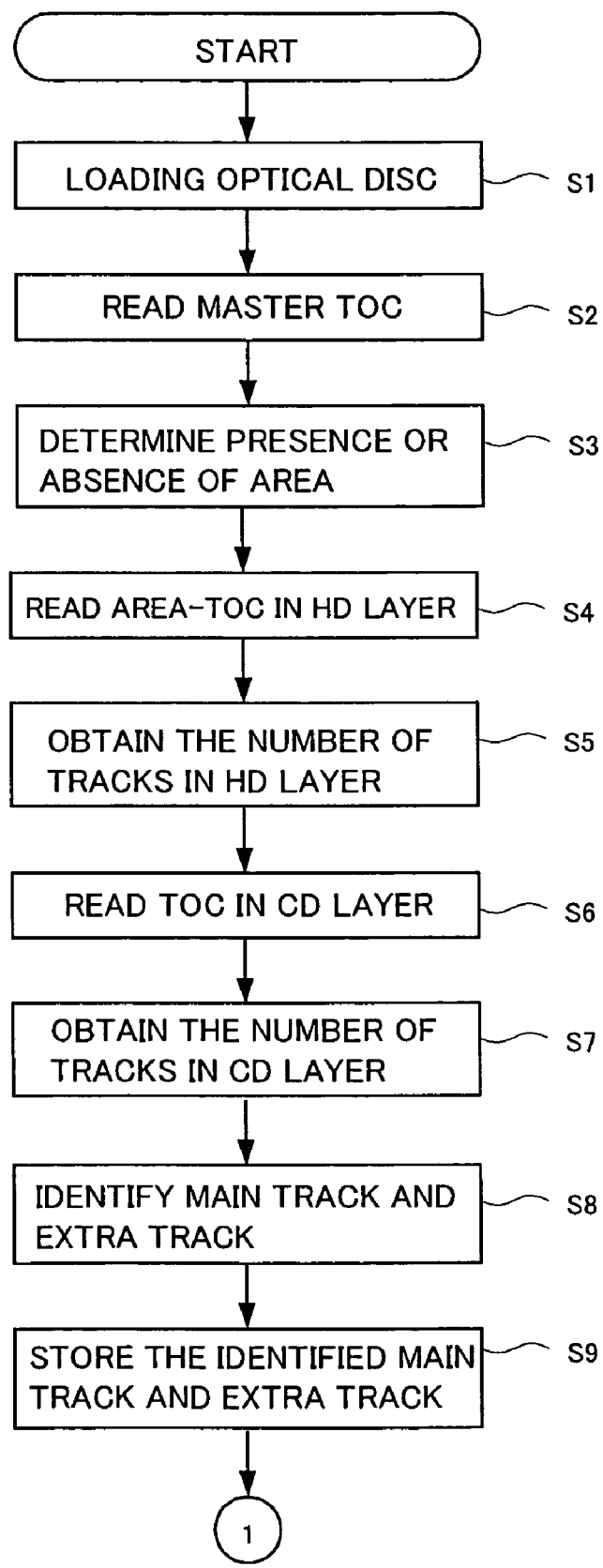
FIG. 2 is a flow diagram explaining a reproducing operation of the optical disc reproducing apparatus relating to the first embodiment of the present invention.
Figure 3:
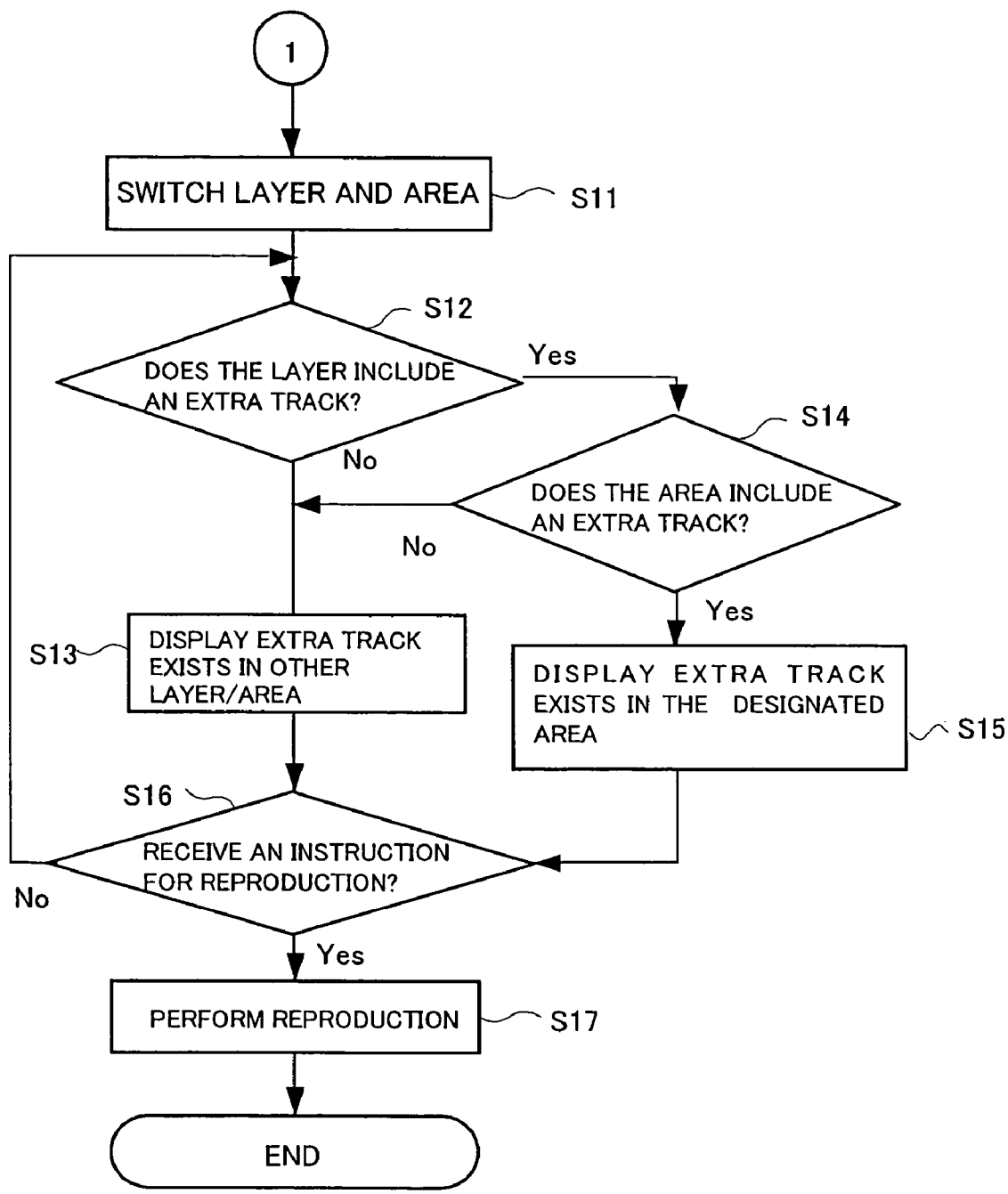
FIG. 3 is a flow diagram explaining an operation of the optical disc reproducing apparatus relating to the first embodiment of the present invention.

Referring to the accompanying drawings, operations when data on an optical disc is reproduced will be explained, conducted by the optical disc reproducing apparatus 100 relating to the present embodiment. FIG. 2 and FIG. 3 show flowcharts to explain reproducing operations of the optical disc reproducing apparatus 100 relating to the present embodiment. It is to be noted that the operations are not limited to those shown by the flowcharts, as far as the same results can be obtained.

At first, a user loads an optical disc into the optical disc reproducing unit 100. The control section 11 detects that the optical disc is loaded by the user, that is, it is mounted on the turntable 1 in settled manner (step S1).

The optical disc reproducing apparatus 100 is set by default to either status, an extra track is targeted for reproduction or not. If there is no instruction from the user, the status by default will be maintained. At this timing, it is also possible for the user to give an instruction via the selection button of the operating section 12, either the extra track is targeted for reproduction or not. In this case, the control section 11 of the optical disc reproducing apparatus 100 receives an instruction from the user via the selection button, either only the main track is targeted for reproduction, or all the tracks including the extra track are targeted for reproduction.

Upon detecting that the optical disc is loaded, the control section 11 reads management information recorded in the master TOC area in the HD layer via the optical pickup 4 (step S2). Then, the control section 11 stores the information thus readout into the storing section 11a.

Subsequently, the control section 11 determines the presence or absence of two-channel stereo area and multi-channel area (step S3). That is, the control section 11 determines the presence or absence of two-channel stereo area and multi-channel area, based on the information recorded in the master TOC area thus readout. At this stage, if the control section 11 determines that there exists only one of those areas, a normal reproducing processing is performed without carrying out the following processing.

For example, in the case of hybrid disc employed in the present embodiment, since it includes both the two-channel stereo area and the multi-channel area, recorded in the master TOC area as such, it is determined that both areas exist.

When it is recognized that both areas exist, the control section 11 reads the management information recorded in the area TOC via the optical pickup 4 (step S4). Here, the control section 11 reads the information recorded in the area-TOC in each of the two-channel stereo area and the multi-channel area of the HD layer. Then, the information thus readout is recorded in the storing section 11a.

While the control section 11 records the information thus readout in the storing section 11a, it further obtains the number of tracks of the digital audio data recorded in each of those areas, out of the information thus readout (step S5).

For example, for the case of the hybrid disk according to the present embodiment, 10 (ten) is obtained as the number of tracks in the two-channel stereo area, and 15 (fifteen) is obtained as the number of tracks in the multi-channel area.

The control section 11 also reads TOC information of the CD layer in the same manner as described above (step S6). In other words, the control section 11 reads the TOC information recorded in the lead-in area of the CD layer via the optical pickup 4. Then, the control section 11 stores the information thus readout in the storing section 11a.

While the control section 11 records in the storing section 11a, the information thus readout in step S6, it further obtains the number of tracks of the digital audio data recorded in the program area of the CD layer, out of the information thus readout (step S7).

For example, for the case of the hybrid disc according to the present embodiment, 10 (ten) is obtained as the number of the tracks of the CD layer.

If the optical disc loaded in the optical disc reproducing apparatus 100 is not a hybrid disc, that is, if the optical disc is either a single layer disc or a dual-layer disc having only HD layer, the processing from steps S6 to S7 are not carried out. Determination as to a type of the loaded optical disc (hybrid disc, single layer disc or dual-layer disc) may be made by the optical disc reproducing apparatus 100 by itself, or by receiving a designation from the user, at the time when the optical disc is loaded in the apparatus in step S1 above.

Either of the processing from steps S2 to S5 for reading and recording the information in the HD layer, and the processing from steps S6 to S7 for reading and recording the information in the CD layer may be carried out in advance.

Subsequently, the identification section 11b of the control section 11 identifies the main track and the extra track according to the number of tracks in each of the areas of the HD layer thus obtained, and identifies an area having the extra track (step S8). The identification section 11b further identifies whether or not there exists an extra track in the CD layer according to the number of tracks in the CD layer thus obtained.

In other words, the identification section 11b identifies the area having the extra track, the main track, and the extra track, based on the number of tracks in the two-channel stereo area (the number of the main track), and the number of tracks in the multi-channel area (the number of the main track and the extra track) as obtained in step S5. Then, based on the number of the tracks in the CD layer obtained in step S7, the identification section 11b identifies whether or not an extra track exists in the CD layer.

Specifically, the numbers of tracks in respective areas of the HD layer thus obtained are compared, and the area having a larger number of tracks is identified as an area having the extra track. In addition, the smaller number out of the numbers of tracks for the both areas thus obtained is identified as the maximum track number (No.) of the main track. Then, a track having as a track number, a natural number less than or equal to the maximum track number is identified as the main track.

After the main track is identified, the identification section 11b identifies a track having a track number, between the number obtained by adding 1 (one) to the maximum track number of thus identified main track and the larger number of tracks out of the two areas.

Furthermore, the identification section 11b compares the number of tracks in the CD layer with the numbers of tracks in the HD layer as described above, and if the number of tracks in the CD layer is equal to the smaller number, it is determined that there is no extra track. On the other hand, if the number of tracks in the CD layer is equal to the larger number, it is determined that there is an extra track.

For example, in the hybrid disk according to the present embodiment, the number of tracks thus obtained is 10 (ten) for the two-channel stereo area, and 15 (fifteen) for the multi-channel area. The smaller number is 10 (ten) for the two-channel stereo area. Therefore, the tracks having the track numbers of 1 to 10 are identified as main tracks. The tracks having the track numbers of 11 to 15 are identified as extra tracks. In addition, the multi-channel area is identified as an area having an extra track.

Since the number of tracks of the CD layer is 10 (ten), it is determined that the CD layer has no extra track.

The control section 11 stores in the storing section 11a, each of the track numbers of the main tracks and the extra tracks, and the area and the layer having the extra track, which are identified in step S8 (step S9).

If an area having the extra track is known, it is possible to construct such that the number of tracks in the other area is assumed as the maximum track number of the main track. For this case, respective track numbers of the main tracks and the extra tracks are recorded in the storing section 11. For example, in the present embodiment, if it is predetermined that there is an extra track in the multi-channel area, the obtained number of tracks 10 (ten) of the two-channel stereo area is known to be the maximum track number of the main track. Then, each of the track numbers of the main tracks and the extra tracks is identified and recorded.

When reading of the management information from the optical disc and recording in the storing section 11a are completed, the optical disc reproducing apparatus 100 becomes available for receiving an instruction from a user as to a layer for reproduction.

At this timing, the user is allowed to provide an instruction to reproduce data in a desired layer and area, with the layer switching button and the area switching button of the operating section 12. The layer switching button allows the user to designate a layer as a target of reproduction (HD layer or CD layer), and when a HD layer is designated, the area switching button further allows the user to designate an area as a target of reproduction (two-channel stereo area or multi-channel area).

When the control section 11 receives an designation of layer and/or area as a target of reproduction from the user via the layer switching button and/or the area switching button, the control section 11 switches the layer and area to those targeted for reproduction according to the designation (FIG. 3, step S11). It is to be noted if the loaded optical disc is not a hybrid disc, that is, if it is a single layer disc or a dual-layer disc, the control section 11 only receives an instruction to switch areas.

The control section 11 determines whether or not the layer targeted for reproduction includes an extra track (step S12). Here, the control section 11 makes a determination by referring to the information which is identified in step S8, and stored in the storing section 11a in S9.

When the layer targeted for reproduction includes an extra track (Yes in step S12), the control section 11 determines next whether or not the area targeted for reproduction according to the user instruction includes an extra track (step S14). In the present embodiment, the control section 11 refers to the storing section 11a, and if the area thus designated corresponds to the area recorded as the one including an extra track, it is determined that the area includes the extra track.

It is to be noted that if the layer designated in step S11 is a CD layer, and it includes an extra track, the processing in step S14 is not carried out.

The area targeted for reproduction includes an extra track, the control section 11 displays on the display section 13 for a predetermined period of time, indication that an extra track exists in the area designated for reproduction (step S15). The control section 11 further displays on the display section 13 a prompt for the user to input an instruction for conducting reproduction or an instruction for switching the layer and/or area. Then, the optical disc reproducing apparatus 100 comes into a status waiting for an instruction from the user.

Viewing the display as described above, the user becomes aware that the designated area includes an extra track. If the user wishes to reproduce the data in the area including the extra track, the user presses the play button to instruct the reproduction. On the other hand, if the user does not wish to reproduce the data in the area including the extra track, the user presses the layer switching button and/or the area switching button, instead of the play button, and instructs to switch the designation of layer and/or area as a target for reproduction.

Upon receipt of an instruction of reproduction from the user (Yes in step S16), the control section 11 carries out reproduction as to the layer or area designated in step S11 (step S17).

Upon receipt of an instruction of switching from the user (No in step S16), the control section 11 switches the reproduction target to the area or the layer which includes no extra track (step S18). This is because the area targeted for reproduction and currently selected includes the extra track, and the user does not wish to reproduce the data in the area including the extra track. Subsequently, the control section 11 carries out reproducing as to the area or the layer, after the switching is conducted (step S17).

It is also contemplated that the control section 11 that received the switching instruction in step S16 may not automatically carry out switching to the area or layer including no extra track. Instead, the processing is returned to step S11, to receive again from the user a designation of layer and/or area targeted for reproduction, and then the subsequent processing may be repeated.

At the time of loading the optical disc, if an instruction was received from the user in advance as to whether or not the data on the extra track is to be reproduced, the following process may be carried out.

In step S15, the control section 11 shows a display as described above and it determines the instruction received at the time of loading the optical disc. Since the currently designated area includes an extra track, if the instruction indicates that a target for reproduction is only the main track, the reproduction is not carried out as far as there receives no input of reproducing instruction or switching instruction from a user within a predetermined period of time. On the other hand, if the instruction indicates that all the tracks including the extra tracks are targeted for reproduction, the reproduction is carried out, if there receives no input of instruction from the user within a predetermined period of time.

If it is determined in step S12 that the designated layer includes no extra track, and it is also determined that in step S14 the designated area includes no extra track either, the control section 11 displays on the display section 13 for a predetermined period of time, indication that the designated layer and/or area includes no extra track, and the extra track is included in another area (step S13). Subsequently, the control section 11 displays on the display section 13 a prompt for the user to input an instruction for conducting reproduction or an instruction for switching the layer and/or area. Then, the optical disc reproducing apparatus 100 comes into a status waiting for an instruction from the user.

Viewing this display, the user becomes aware that the designated layer and/or area include no extra track. If the user wishes to reproduce data in the layer and/or area which includes no extra track, the user presses the play button to instruct the reproduction.

In step S12 or in step S14, if the layer or the area designated by the user includes no extra track, and the user recognizes the existence of an extra track at the time of loading the optical disc, the display shown in step S13 may indicate that the designated layer and/or area include no extra track. In the present embodiment, if the user designates a reproduction target via the selection button at the time of loading the optical disc, it may be one of the cases that a user recognizes the existence of a track including the extra track.

Upon receipt of an instruction for reproduction from a user (step S16), the control section 11 carries out reproducing data in the layer and/or area designated in step S11.

On the other hand, if the user wishes to reproduce data in the area including the extra tracks, designation of the reproduction target layer and/or area can be switched via the layer switching button and/or the area switching button. At this stage, since the reproduction target layer or area currently selected is a layer or an area which includes no extra track, upon receipt of a switching instruction, the control section 11 switches the reproduction target area so that a layer or an area including the extra tracks becomes a target for reproduction (step S18). Then, reproduction is carried out for the area after the switching is conducted (step S17).

It is also contemplated that the control section 11 that received the switching instruction in step S16 may not carry out switching to the area or layer including the extra track for reproduction as described above. Instead, the processing is returned to step S11, to receive again from the user a designation of layer or area, and then the subsequent processing may be repeated.

At the time of loading the optical disc, if an instruction was received from the user in advance as to whether or not the data on the extra track is to be reproduced, the following processing may be carried out.

In step S13, the control section 11 shows a display as described above, and it determines the instruction received at the time of optical disc loading. Since the currently designated area includes no extra track, if the instruction indicates that a target for reproduction is only the main track, the reproduction is carried out, as far as there receives no input of reproducing instruction or switching instruction from a user within predetermined period of time. On the other hand, if the instruction indicates that all the tracks including the extra track are targeted for reproduction, the reproduction is not carried out as far as there receives no instruction input from the user within a predetermined period of time.

In the processing as described so far, since it is sufficient in the present embodiment as far as an area having the extra tracks can be determined, identification of the main track and the extra track in the process of step S8 is arbitrarily performed. It is sufficient if the presence or absence of extra track can be determined in each layer and area.

As discussed above, the optical disc reproducing apparatus 100 according to the first embodiment of the present invention is capable of notifying the user before a reproducing instruction is made, as to whether or not a layer or an area designated by the user as a reproduction target includes an extra track. More particularly, even if the extra track is included in a layer and/or area that are not designated by the user as a reproducing target, it is possible to notify the user that there exists an area where the extra track is included.

Therefore, even when the user is not aware of the existence of the extra track or has forgot that it exists, the user can recognize the existence of the extra track just by loading the optical disc, without referring to the jacket and the like.

In addition, since the user can designate a layer or an area as a target for reproduction again after recognizing the existence of the extra track, the user can easily determine whether only the main track is targeted for reproducing or all the tracks including the extra track are targeted for reproduction, and provide a reproducing instruction.

In the embodiment as described above, the user is notified of the existence of the extra track after a layer or an area targeted for reproduction is designated. However, it may also be possible to construct the present invention such that a notification as to the existence of the extra track is provided to the user, prior to receiving the designation from the user.

Figure 4:
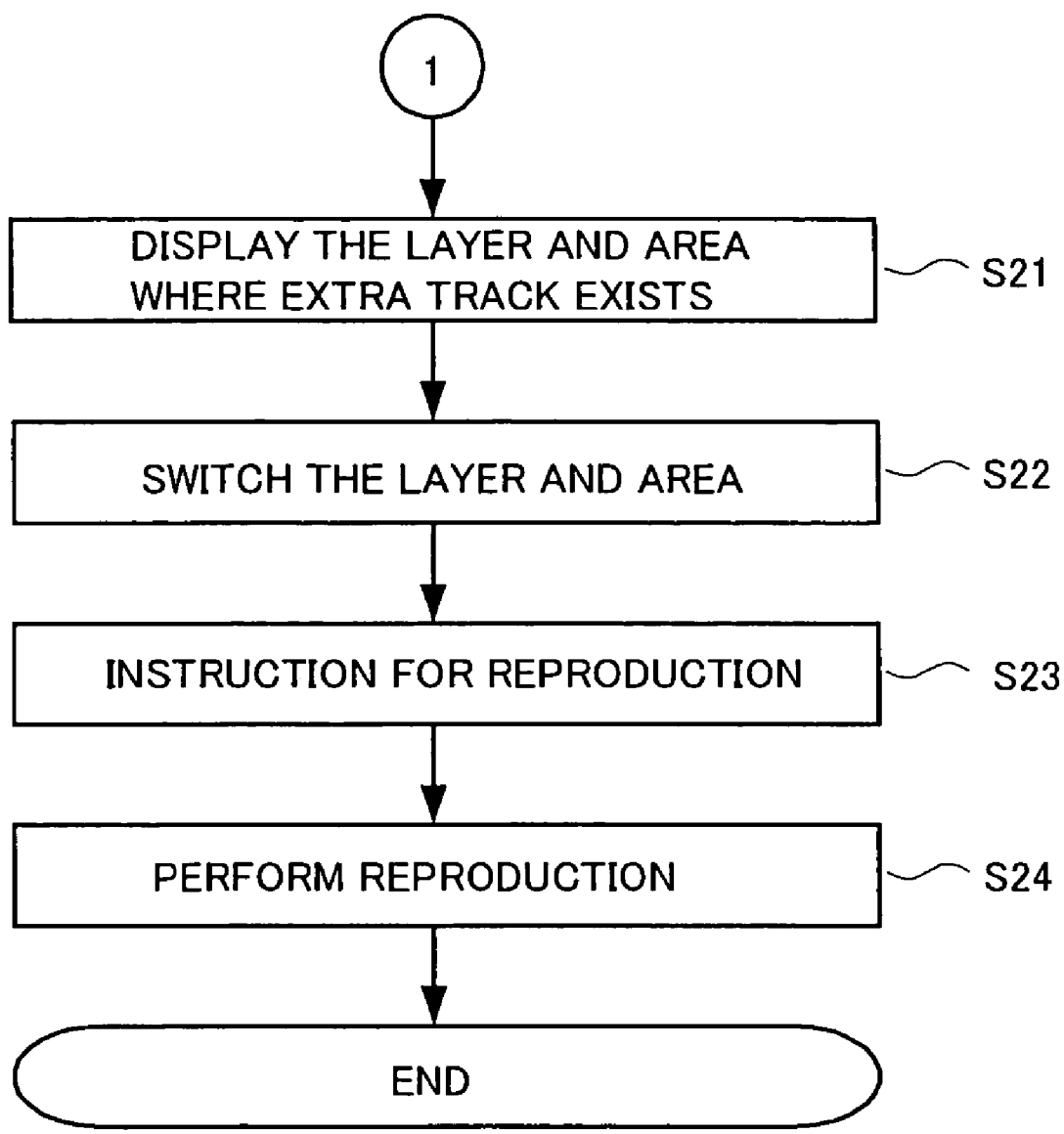
FIG. 4 is a flow diagram explaining an operation of the optical disc reproducing apparatus relating to a variation of the first embodiment of the present invention.

FIG. 4 shows a part of a processing flow for the case that a notification as to the existence of the extra track is provided to the user, prior to receiving the designation from the user, the part being different from the flow as shown in FIG. 2 and FIG. 3. The processing up to step S9 in FIG. 2 is the same.

For this case, the control section 11 reads management information of the master TOC and/or the area-TOC, identifies a main track, an extra track, an area including the extra track and a layer including the extra track, and stores the identified items in the storing section 11a (step S9 in FIG. 2). Then, as shown in FIG. 4, the control section 11 displays on the display section 13 information for a layer and/or an area where the extra track exists (step S21). The user views this display, and designates a desired layer and/or area via the layer switching button and/or the area switching button (step S22). The control section 11 receives a reproducing instruction from the user, and starts reproducing data in the layer or area designated in step S22 (step S23, step S24). According to this arrangement, more certainly, the user can recognize the existence of the extra track and data in a desired layer or area can be reproduced.

Second Embodiment

Figure 5:
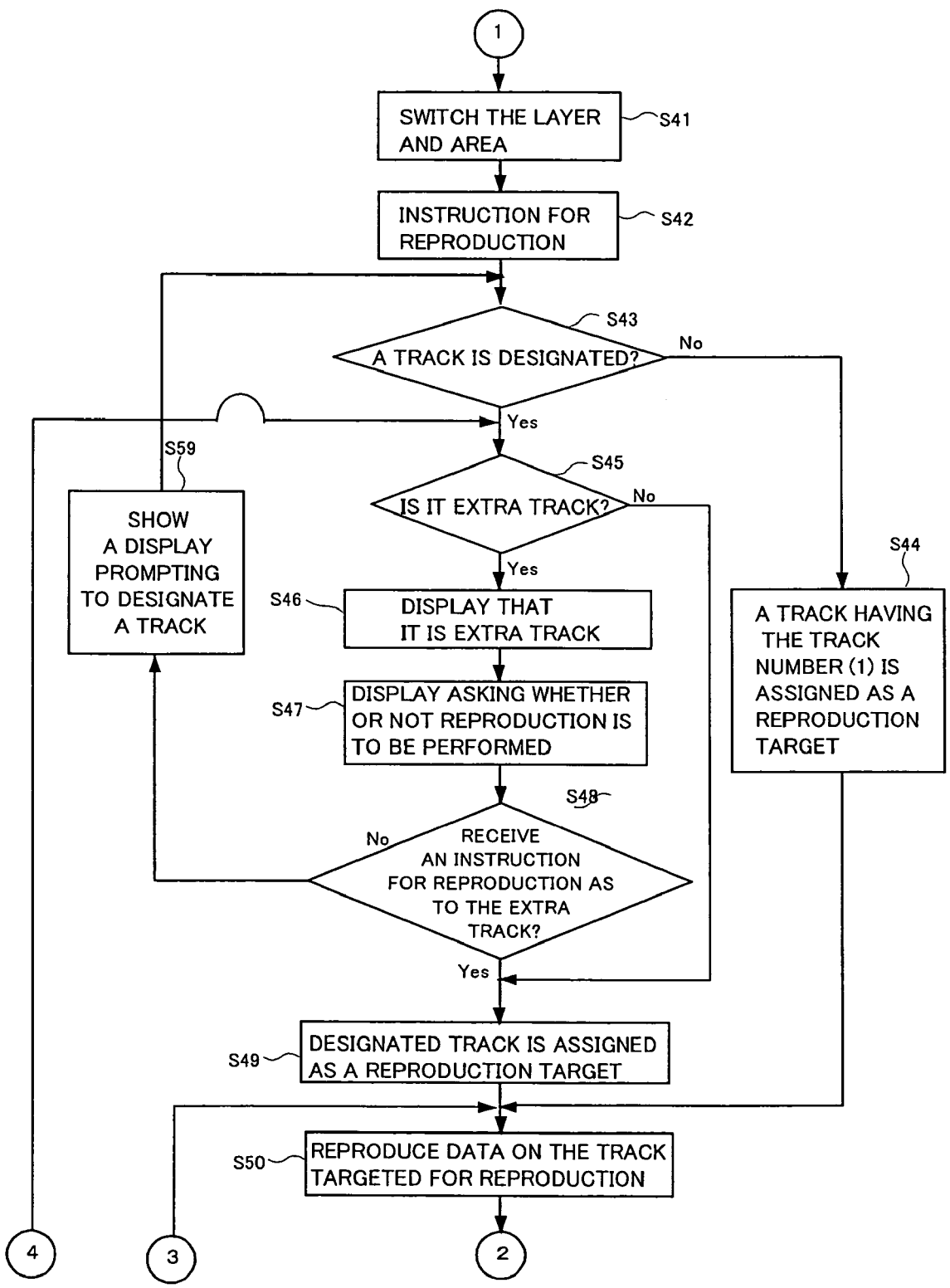
FIG. 5 is a flow diagram explaining a reproducing operation of the optical disc reproducing apparatus relating to the second embodiment of the present invention.
Figure 6:
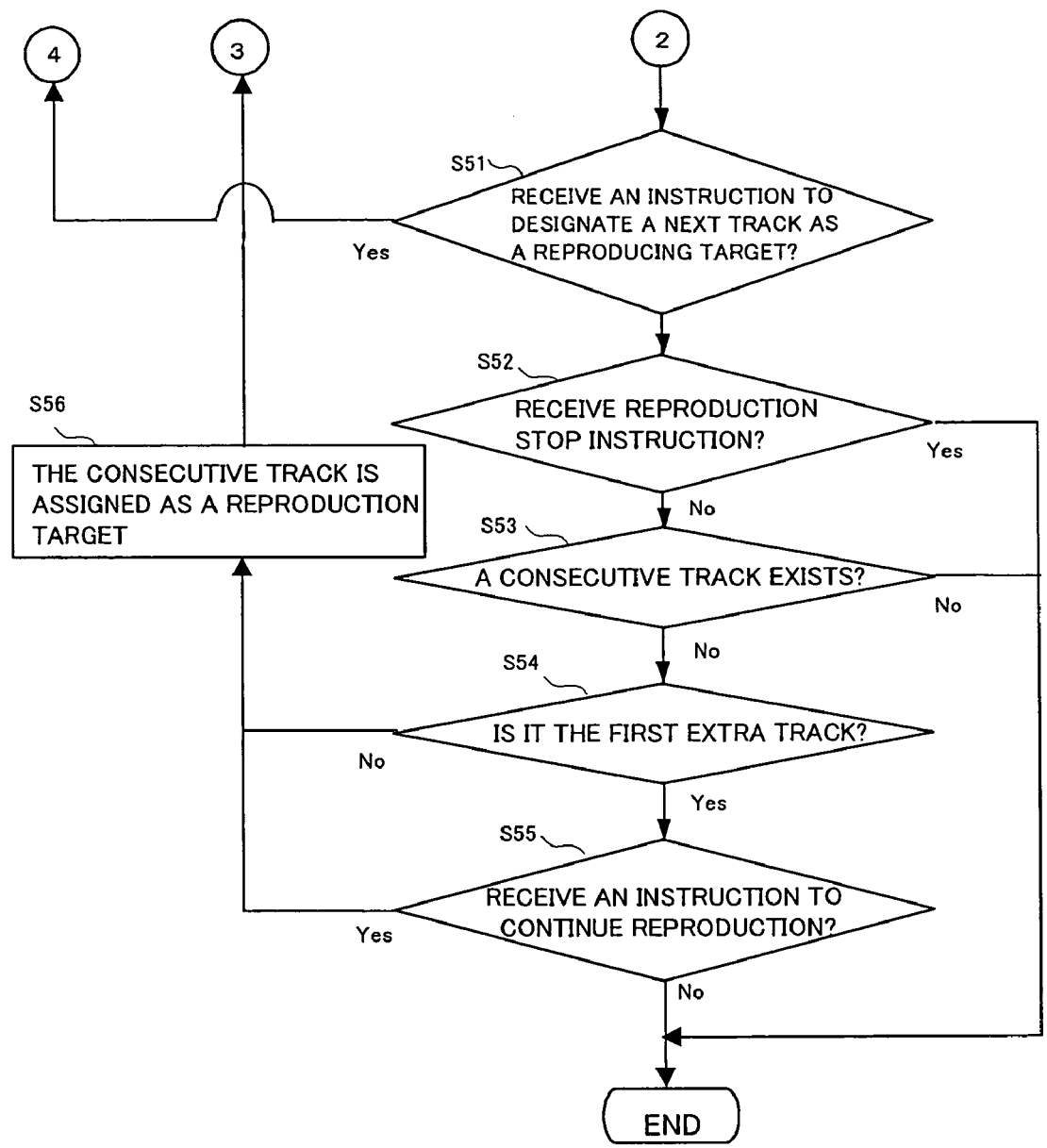
FIG. 6 is a flow diagram explaining a reproducing operation of the optical disc reproducing apparatus relating to the second embodiment of the present invention.

The second embodiment of the present invention will be explained with reference to the accompanying drawings. FIG. 5 and FIG. 6 show a flow to explain the processing of present embodiment. For easy understanding, the same elements in FIG. 1 to FIG. 3 are labeled the same, and explanations thereof will not be redundantly made.

In the present embodiment, the optical disc reproducing unit 100 requests a user to determine whether or not reproduction is to be carried out, depending on a designated track is an extra track or not. Operations of the optical disc reproducing apparatus 100 according to the present second embodiment will be explained in detail in the following.

According to the processing in step S1 to S9 in FIG. 2 of the first embodiment, based on the management information read from the loaded optical disc, a main track and an extra track are identified, as well as an area including the extra track is identified, and those identified items are recorded in the storing section 11a. Then, the optical disc reproducing apparatus 100 comes into a status for receiving an instruction from the user as to a layer targeted for reproduction and the like, and the processing is shifted to the flow in FIG. 5.

A user can designate a layer or an area targeted for reproduction, via the layer switching button and the area switching button in the operating section 12. Furthermore, the user is allowed to designate a layer targeted for reproduction (HD layer or CD layer) via the layer switching button, and when the HD layer is designated, the user is further allowed to designate an area targeted for reproduction (two-channel stereo area or multi-channel area) via the area switching button.

Upon receipt of designation of a layer and/or area targeted for reproduction from a user via the layer switching button and/or area switching button, the control section 11 switches a layer and area targeted for reproduction according to the user's designation (FIG. 5, step S41). It is to be noted that if the loaded optical disc is not a hybrid disc, that is, if it is a single layer disc or a dual-layer disc, the control section 11 only receives an instruction to switch areas.

The user instructs to reproduce data on a track via the play button in the operation section 12. At this timing, if the user wishes to start the reproduction from a predetermined track, a track targeted for starting reproduction is designated by a corresponding designation button in the operating section 12. The optical disc reproducing apparatus 100 carries out reproduction continuously from the designated track or a track having the track number 1 (one).

Upon receipt of the reproducing instruction from the user via the play button, the control section 11 waits for an instruction as to a track targeted for starting reproduction, for a predetermined period of time (step S42).

If the control section 11 does not receive a designation of a specific track via the designation button for a predetermined period of time (No in step S43), the track having the track number 1 (one), in the layer or area designated in step S41, is set as a reproduction target (step S44), and digital audio data on this track is reproduced (step S50).

On the other hand, if a designation of a specific track is received within a predetermined period of time (Yes in step S43), the control section 11 determines whether or not the track thus designated corresponds to the extra track as stored in the storing section 11a in step S10 (step S45).

If the designated track is not the extra track (No in step S45), that is, if it is a main track, the track thus designated is set as a reproduction target (step S49), and digital audio data on this track is reproduced (step S50).

If the track thus designated is an extra track (Yes in step S45), the control section 11 displays on the display section 13 indication that the designated track is an extra track (step S46). This display is shown for a predetermined period of time, for example, for several seconds. Viewing this display, the user becomes aware that the designated track is an extra track.

Subsequently, the control section 11 displays on the display section 13 a prompt for the user to input an instruction whether or not data on the designated track is to be reproduced (step S47). After this display is shown, the user makes a determination, for example based on a jacket and the like, whether or not the data on this track is to be reproduced, and gives an instruction for reproduction. At this timing, the user instructs whether or not data on the track designated in step S43 is to be reproduced, by the cursor button in the operating section 12. For example, the user can select whether or not the data on the track designated by the cursor button is to be reproduced. After the selection is made, the user presses the decision button of the operating section 12, and inputs an instruction into the optical disc reproducing apparatus 100.

The display prompting the user to input whether or not reproduction is to be carried out, may be shown on the display section 13, together with the display indicating that the designated track is an extra track.

Upon receipt of an instruction to reproduce data on the track (Yes in step S48), the control section 11 sets the designated track as a track targeted for reproduction (step S49), and reproduces digital audio data on this track (step S50).

Upon receipt of an instruction not to reproduce data on the designated track from the user (No in step S48), the control section 11 displays on the display section 13 a prompt for the user to designate a new track (step S59). In response to this display, the user is allowed to designate a track within a predetermined period of time. Then, the processing is returned to step S43, and proceeds to the subsequent processing depending on whether a new track is designated or not.

When reproducing data on the track targeted for reproduction in step 50 is completed, the control section 11 determines, during the reproduction of the track targeted for reproduction, whether or not there received an instruction to reproduce data on a track other than the track consecutive from the track targeted for reproduction (step S51 in FIG. 6).

If an instruction for reproducing data on the track other than the consecutive track is received (Yes in step S51), the control section 11 processes returning to step S45 in FIG. 5, and determines whether or not the track thus designated is an extra track, and proceeds to the subsequent processing.

On the other hand, if there has not been received an instruction for reproduction (No in step S51 in FIG. 6), the control section 11 determines whether or not there has been received a reproduction stop instruction from the user during reproduction on the track targeted for reproduction in step S49 in FIG. 5 (FIG. 6 step S52).

If the reproduction stop instruction has been received (Yes in step S52), the control section 11 completes reproducing data on the loaded optical disc.

On the other hand, if there has not been received a reproduction stop instruction (No in step S52), the control section 11 determines the presence or absence of a consecutive track (step S53).

If there is no consecutive track (No in step S53), reproducing data on the loaded optical disc is completed.

If there is a consecutive track (Yes in step S53), it is determined whether or not the consecutive track is the first extra track (step S54).

Specifically, the control section 11 compares the track number of the extra track recorded in the storing section 11a, and the track number of the consecutive track, and according to the track number of the consecutive track, it is determined whether or not the track is the first extra track.

If it is the first extra track (Yes in step S54) the control section 11 displays on the display section 13 a prompt for the user to input an instruction whether or not the reproduction is to be continued (step S55).

It is to be noted that the display prompting the user to input whether or not the reproduction is to be continued may be displayed on the display section 13, together with the display indicating that the next track targeted for reproducing is an extra track.

If an instruction for reproduction is received from the user (Yes in step S55), the control section 11 sets the consecutive track as a track targeted for reproduction (step S56), and reproduces the digital audio data on the track targeted for reproduction (step S50 in FIG. 5).

If an instruction not to continue reproducing is received from the user (No in step S55), the control section 11 completes reproduction of data on the loaded optical disc.

Further in step S54, if it is determined that the consecutive track is not the first extra track (No in step S54), the consecutive track is set as a reproduction target as it is, and digital audio data on this track is reproduced (step S49 in FIG. 5).

It is to be noted that in the processing above, reproduction is continuously performed from the track having the track number 1 (one) when the track to be reproduced is not designated, and alternatively when the track is designated, reproduction is performed from this track. However, this is just an example, and the present embodiment is not limited to this example. For example, it is applicable to the case where the order of tracks for reproduction is designated and registered in advance, and carrying out reproduction in the order thus registered. Alternatively, it is also applicable to the case where data on the tracks is randomly reproduced.

In the example above, in step S54 in FIG. 6, it is determined whether or not the track in the next order of reproduction is the first extra track. However, it is also possible to determine just whether or not it is an extra track regardless whether it is the first or not. Then, if it is the extra track, the control section 11 displays on the display section 13 a prompt for the user to input an instruction whether or not the reproduction is to be continued (Yes in step S54), and proceeds to the subsequent processing. If it is not an extra track (No in step S54), the control section 11 proceeds to the subsequent processing, setting the track in the next reproducing order as a track targeted for reproduction, without waiting for the user's instruction.

As explained above, according to the present embodiment, the optical disc reproducing apparatus 100 displays on the display section 13 indication that the track is an extra track, when digital audio data on the extra track recorded in the optical disc is designated as a target for reproduction. Then, the optical disc reproducing apparatus 100 reproduces the digital audio data on the extra track, when it receives an instruction from the user.

Therefore, the user is allowed to know whether or not the track designated for reproduction is an extra track prior to the reproduction, and based on this information, and also allowed to determine whether or not the data on the track is to be reproduced. Those advantages above are similarly found in any of the following cases, continuous reproduction in the order of the track number, random reproduction for randomly reproducing the data on the track, and reproduction by designating a track number.

There may be a case that, in the extra track, there is recorded a track for audio data containing a music producing scene, and audio data of karaoke performance and the like. On the other hand, there may also be a case that a surround test signal such as sine wave or white noise is recorded in the extra track. According to the present embodiment, it is possible to avoid reproducing data on the extra track unintentionally, on which a test signal and the like may be recorded, being treated in the same way as the audio signal that is recorded in the main track. It is matter of course that if the user wishes to reproduce the data on the extra track, it can be reproduced according to the user's instruction.

According to the present embodiment, it is possible to prevent from occurring such a case in that a test signal in the extra track is suddenly reproduced and an abnormal sound is outputted, which is different from the sound reproduced from the main track.

Accordingly, it is further possible to prevent from occurring such a case in that the user misidentifies the abrupt reproduction of such abnormal sound is caused by breakdown of the optical disc reproducing apparatus 100, or such abnormal sound may spoil the fun for the user.

According to the present embodiment, the user is allowed to selectively reproduce the audio data on a main track, even if information for a layer or an area including an extra track is not checked with a jacket and the like, which are attached to the optical disc to be reproduced.

As thus described, the present embodiment will enhance the usability of the optical disc reproducing apparatus, which is capable of reproducing data on an optical disc having a main track and an extra track.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of the invention.

The disclosure of Japanese Patent Application No. JP 2004-097985 filed on Mar. 30, 2004, Japanese Patent Application No. JP 2004-104168 filed on Mar. 31, 2004, and Japanese Patent Application No. JP 2004-235475 filed on Aug. 12, 2004, including specification, claims, drawings and abstract is incorporated herein by reference in its entirety.

What is claimed is:

1. An optical disc reproducing apparatus comprising,
   a reproducing section which reproduces either a first audio data item involving a first main track, the first audio data item being recorded in a first recording area on said optical disc, or a second audio data item involving an extra track in addition to a second main track containing the same contents as those of said first main track, the second audio data item being recorded in a second recording area on said optical disc, and
   an identification section which identifies each of said second main track and said extra track for said second audio data item, based on the number of tracks of said first audio data item and said second audio data item.

2. The optical disc reproducing apparatus according to claim 1, further comprising, a determination section which determines whether or not said extra track exists in a recording area that is a target to be reproduced by said reproducing section.

3. The optical disc reproducing apparatus according to claim 1, wherein,
when an optical disc is provided with a layer having only a track corresponding to said first main track in addition to said layer provided with said first recording area and said second recording area, said reproducing section reproduces data on either of said layers, and
said determination section determines whether or not said extra track exists in a layer that is a target to be reproduced by said reproducing section.

4. The optical disc reproducing apparatus according to claim 2, further comprising, a display section which provides a display informing presence or absence of the extra track, which has been determined by said determination section.

5. The optical disc reproducing apparatus according to claim 4, wherein, when said determination section determines that said extra track does not exist in the layer that is a target to be reproduced by said reproducing section, said display section provides a display prompting a user to input an instruction whether or not data on said extra track is to be reproduced.

6. The optical disc reproducing apparatus according to claim 1, further comprising, a determination section which determines whether or not a track that is a target to be reproduced by said reproducing section corresponds to the extra track identified by said identification section.

7. The optical disc reproducing apparatus according to claim 6, further comprising, a track designation section which receives from a user a designation of a track that is to be targeted for reproduction.

8. The optical disc reproducing apparatus according to claim 6, further comprising, a display section which provides a display informing that a track targeted for reproduction is the extra track, when said determination section determines as such.

9. The optical disc reproducing apparatus according to claim 6, further comprising, a display section which provides a display informing that a track targeted for reproduction is the extra track when said determination section determines as such, and also provides a display prompting a user to input whether or not data on said track is to be reproduced.

10. The optical disc reproducing apparatus according to claim 6, further comprising,
a reproduction instructing section which receives an input from a user to instruct said reproducing section to perform reproduction, wherein,
when said determination section determines that a track targeted for reproduction is said extra track, said reproducing section reproduces data on said track if said reproducing section receives from the user an instruction to perform reproduction via said reproduction instruction section.

11. An optical disc reproducing method, which reproduces a first audio data item involving a predetermined number of a first main track, the first audio data item being recorded in a first recording area on said optical disc, and a second audio data item involving an extra track in addition to a second main track containing the same contents as those of the predetermined number of said first main track, the second audio data item being recorded in a second recording area on the optical disc, comprising,
identifying each of said main track and said extra track for said second audio data item based on the number of tracks of said first audio data item and said second audio data item.

12. The optical disc reproducing method according to claim 11, further comprising, determining whether or not said extra track exists in a recording area that is targeted for reproduction.

13. The optical disc reproducing method according to claim 11, wherein, when data on an optical disc is reproduced, which has a layer having only a track corresponding to said first main track without including a track corresponding to the extra track, in addition to said layer provided with said recording areas, it is determined whether or not said extra track exists in a layer that is targeted for reproduction.

14. The optical reproducing method according to claim 12, further comprising providing a display informing presence or absence of the extra track, which has been determined.

15. The optical reproducing method according to claim 12, further comprising when it is determined that said extra track does not exist in a recording area targeted for reproduction, providing a display prompting a user to input an instruction whether or not a reproduction as to said extra track is to be performed.

16. The optical reproducing method according to claim 11, further comprising, determining whether or not a track targeted for reproduction corresponds to the extra track thus identified.

17. The optical reproducing method according to claim 16, further comprising, receiving a designation from a user as to a track targeted for reproduction.

18. The optical reproducing method according to claim 16, further comprising, providing a display informing that the track targeted for reproduction is said extra track, when it is determined as such.

19. The optical reproducing method according to claim 16, further comprising, providing a displays informing that the track targeted for reproduction is said extra track, when it is determined as such, and also a display prompting a user to input an instruction whether or not data on the track is to be reproduced.

20. The optical reproducing method according to claim 16, further comprising,
receiving a reproducing instruction from a user, wherein,
when it is determined that a track targeted for reproduction is said extra track, data on said track is reproduced upon receipt of the reproducing instruction from said user.

* * * * *